(12) United States Patent
Stanley

(10) Patent No.: US 9,973,076 B1
(45) Date of Patent: May 15, 2018

(54) SWITCHING REGULATOR SYNCHRONOUS NODE SNUBBER CIRCUIT

(71) Applicant: Silanna Asia Pte Ltd, Singapore (SG)

(72) Inventor: Marshall Stanley, Chapel Hill, NC (US)

(73) Assignee: Silanna Asia Pte Ltd, Singapore (SG)

( * ) Notice: Subject to any disclaimer, the term of this patent is extended or adjusted under 35 U.S.C. 154(b) by 0 days. days.

(21) Appl. No.: 15/705,745

(22) Filed: Sep. 15, 2017

Related U.S. Application Data

(63) Continuation of application No. 15/353,554, filed on Nov. 16, 2016, now Pat. No. 9,768,678.

(51) Int. Cl.
*H02M 1/34* (2007.01)
*H02M 3/158* (2006.01)

(52) U.S. Cl.
CPC .............. *H02M 1/34* (2013.01); *H02M 3/158* (2013.01); *H02M 2001/348* (2013.01)

(58) Field of Classification Search
CPC .............. H02M 1/34; H02M 2001/342; H02M 2001/344; H02M 2001/346; H02M 2001/348; H02M 3/156; H02M 3/158; H02M 3/1588
See application file for complete search history.

(56) References Cited

U.S. PATENT DOCUMENTS

| | | | |
|---|---|---|---|
| 5,488,554 A | 1/1996 | Green | |
| 6,091,610 A | 7/2000 | Garcia et al. | |
| 6,278,264 B1 | 8/2001 | Burstein et al. | |
| 7,088,591 B2 | 8/2006 | Kishimoto et al. | |
| 8,278,894 B2 | 10/2012 | Xu et al. | |
| 9,065,357 B2 * | 6/2015 | Tabata | H02M 7/538 |
| 9,768,678 B1 * | 9/2017 | Stanley | H02M 1/34 |
| 2005/0180179 A1 | 8/2005 | Hirst | |
| 2012/0049834 A1 | 3/2012 | Pommerenke et al. | |
| 2016/0036313 A1 | 2/2016 | Li et al. | |

(Continued)

FOREIGN PATENT DOCUMENTS

WO 2015049736 A1 4/2015

OTHER PUBLICATIONS

Cooper, Choosing the Right Input Caps for Your Buck Converter, EETimes, Sep. 7, 2007, Available at: http://www.eetimes.com/document.asp?doc_id=1273212, Accessed on: Oct. 25, 2016.

(Continued)

*Primary Examiner* — Gary L Laxton
(74) *Attorney, Agent, or Firm* — The Mueller Law Office, P.C.

(57) ABSTRACT

Various methods and devices that involve snubber circuits for switching power converters are disclosed. An example power converter has a snubbing circuit. The snubber circuit comprises a bypass capacitor connecting an input node of the power converter to a ground node of the power converter, a decoupling capacitor that connects the input node of the power converter to a snubber node, and a snubbing resistor that connects the snubber node to the ground node. The snubbing resistor connects the decoupling capacitor to the ground node of the power converter. The snubbing resistor is greater than 1 ohm. The decoupling capacitor is greater than 5 nanofarads and less than 0.5 microfarads. The bypass capacitor is greater than 1 microfarads.

24 Claims, 8 Drawing Sheets

(56) References Cited

U.S. PATENT DOCUMENTS

2016/0308457 A1* 10/2016 Yuzurihara ............ H02M 7/48
2016/0344279 A1    11/2016 Kanda et al.
2017/0229953 A1*  8/2017 Otake .................... H02M 1/34

OTHER PUBLICATIONS

Notice of Allowance and Fees dated May 26, 2017 for U.S. Appl. No. 15/353,554.
Office Action dated Dec. 29, 2016 for U.S. Appl. No. 15/353,544.
Roy, Reducing EMI in Buck Converters, Richtek Application Note, Literature No. AN045, Jan. 2016.
Simpson, Capacitors are Key to Voltage Regulator Design, Texas Instruments, Literature No. SNOA842, Available at: www.ti.com/lit/snoa842, Accessed on: Oct. 25, 2016.
Taylor et al, Controlling Switch-Node Ringing in Synchronous Buck Converters, Texas Instruments Analog Applications Journal, Q2 2012, Available at: www.ti.com/aaj, Accessed on: Oct. 25, 2016.
Trzynadlowski, Introduction to Modern Power Electronics, 2nd Ed., Chapter 3.4, Wiley and Sons, Nov. 2015.
International Search Report dated Feb. 28, 2018 for PCT Patent Application No. PCT/IB2017/056933.

* cited by examiner

100

SWITCHING REGULATOR SYNCHRONOUS NODE SNUBBER CIRCUIT

CROSS REFERENCE TO RELATED APPLICATIONS

This application is a continuation of U.S. patent application Ser. No. 15/353,554 filed Nov. 16, 2016, which is incorporated herein by reference in its entirety.

BACKGROUND OF THE INVENTION

Electronic devices often need to generate multiple power regimes while only being powered by a single source. For example, a laptop computer may only have a single battery but may need to produce power regimes with different supply voltages for the various components on the laptop. Furthermore, regardless of the need for multiple power regimes, electronic devices often need to condition the power that is delivered to them from an external source. Returning to the example of a laptop, the laptop processor contains sensitive electronics and exhibits a widely varying power demand based on how hard the processor is working. Simply plugging in a DC version of the mains voltage source is not an option because the processor will not be shielded from dips or surges in the power supply and the power supply will likewise not be able to keep pace with the rapid transitions in the power drawn by the processor. The aforementioned requirements are addressed by power converters.

Power converters receive power from a supply power regime and generate a regulated power regime. In one example, the power converter stabilizes a supply voltage in the regulated power regime and provides a varying current from the supply power regime in order to do so. Varying the current allows such a power converter to supply the varying power needs of any components or devices in the regulated power regime while keeping the supply voltage of the regulated power regime stable. Other power converters generate the regulated power regime by varying the voltage while keeping the current stable or vary both the current and voltage to keep an amount of power delivered to the regulated regime stable.

One class of power converters utilize the rapid switching of switches to transfer power in a controlled manner from a power source connected to their input to a load connected to their output. These power converters are often referred to as switching regulators or switched mode regulators. The frequency at which the switches are switched between a conductive and nonconductive state is referred to as the switching frequency of the converter and sets the amount of power transferred from the power source to the load. FIG. 1 provides one example of a switching regulator in the form of a buck converter 100. Buck topology is utilized when the input of the power converter is at a higher voltage than the output. As illustrated, voltage $V_{IN}$ is higher than the voltage $V_{OUT}$. A load current $i_L$ is provided through an output filter comprising inductor 101 and capacitor 102 to load 103. Switches 104 and 105 are controlled by a driver circuit 106 and a feedback circuit 107 which receives information regarding the state of the load and/or power converter on node 108.

During regular operation, switches 104 and 105 alternately provide current from input $V_{IN}$ to the phase node 109 (also called the switch-node) and couple phase node 109 to ground. During the portion of the cycle when switch 105 is on, power to load 103 is being provided solely by energy stored in inductor 101 and capacitor 102. At the same time, energy is being stored in the parasitic inductance and capacitor of switch 105. When the cycle switches, the energy stored in these parasitics, the body diode of switch 105, and the power provided by switch 104 create undesirable ringing at phase node 109. The ringing is undesirable because it creates electromagnetic interference for the remainder of the electronic system of which the converter is a part, and because it increases the time it takes for the control circuit to determine the current state of the system and adjust the switching frequency in response to changes in the power requirements of load 103.

One option for reducing ringing on the phase node 109 is to add an R-C snubber circuit 110 including a capacitor and a resistor. The capacitor of snubber circuit 110 provides current so that the change in current through the inductor is not as rapid during a switching event. The resonant frequency of the R-C circuit is selected to critically damp signals operating at the frequency of the ringing. Snubber circuits thereby reduce ringing and are tuned to have minimal impact on signals of different frequencies. However, the snubber circuit reduces overall efficiency of the power converter by a couple of percentage points. As can be seen in FIG. 1, the capacitor of snubber circuit 110 must be charged and discharged during every switching cycle because the voltage across switch 104 fluctuates during each switching cycle. This decrease in efficiency is felt most prominently at light loads because the power consumed by the snubber circuit is proportional to the difference in the input voltage and the output voltage, and is not dependent on the load current $i_L$.

SUMMARY OF INVENTION

In one approach a power converter with a snubber circuit is disclosed. The snubber circuit comprises a bypass capacitor connecting an input node of the power converter to a ground node of the power converter, a decoupling capacitor that connects the input node of the power converter to a snubber node, and a snubbing resistor that connects the snubber node to the ground node. The snubbing resistor connects the decoupling capacitor to the ground node of the power converter and is greater than 1 ohm. The decoupling capacitor is greater than 5 nanofarads and less than 0.5 microfarads. The bypass capacitor is greater than 1 microfarads.

In a more specific approach, the power converter also includes a phase node and a field effect transistor connecting the input node to the phase node. The decoupling capacitor and snubbing resistor form a single current path from the input node to the ground node. There are no Kirchhoff junctions on the single current path. The snubber circuit dampens oscillations on the phase node.

In another approach a power converter with a snubber circuit is disclosed. The snubber circuit comprises a first capacitor coupling an input node of the power converter to a ground node of the power converter and a second capacitor having a first terminal, wherein the first terminal is coupled to the input node of the power converter, and a resistor coupling a second terminal of the second capacitor to the ground node. The resistor is greater than 1 ohm. The second capacitor is greater than 5 nanofarads and less than 0.5 microfarads. The first capacitor is greater than 1 microfarads.

In a more specific approach, the power converter also includes a phase node and a power transistor having a gate node and coupling the input node to the phase node. The first capacitor forms a first circuit branch between the input node and ground. The second capacitor and resistor form a second circuit branch between the input node and ground. The first and second circuit branches are the only current paths through the snubber circuit to the ground node. The snubber circuit dampens oscillations on the phase node.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

A high efficiency snubber circuit for a switching power converter prevents ringing on the phase node (also called the switch-node) of the power converter while providing for reduced power loss during any given switching cycle as compared to prior approaches. The snubber circuit is positioned to provide charge to and receive charge from the parasitic inductances and capacitors of the switching transistors while not lying on the circuit path between the input and load of the power converter, or across the load of the power converter. The components of the snubber circuit are selected in part based on the desired operating modes of the power converter. The components can be implemented in numerous ways as described below. Although the example of a synchronous buck converter is provided in detail, the general teachings of the disclosure are equally applicable to differing switching regulators such as buck, boost, buck-boost, boost-buck, or transformer-based converters.

A snubber circuit can dampen phase node oscillations, and can provide charge to or pull charge from the parasitics on the phase node, without being directly connected to the phase node itself. In particular, a properly sized resistor capacitor (R-C) snubber circuit coupled to the input of a power converter can provide charge to the phase node through the switch that is coupled to the input node. The sizing of the R-C snubber circuit can be conducted to match the frequency of the ringing on the phase node that would otherwise occur but for the introduction of the phase node. The frequency depends on various factors such as the switching frequency of the regulator, the characteristics of the supply and load power regimes, the output filter of the regulator, and the characteristics of the switches.

Figure 1:
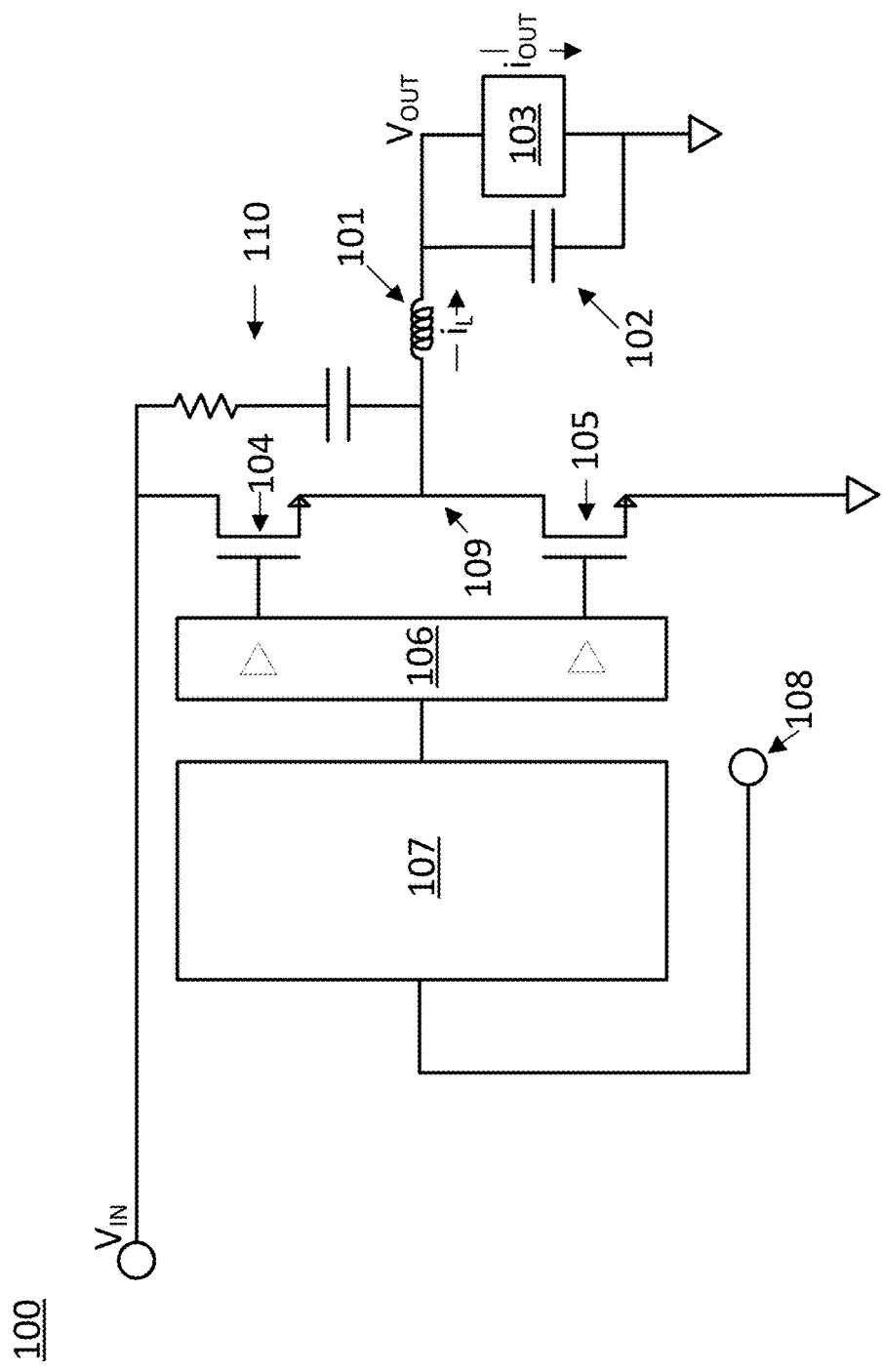
FIG. 1 is a block diagram of a power converter with a snubber circuit in accordance with the related art.
Figure 2:
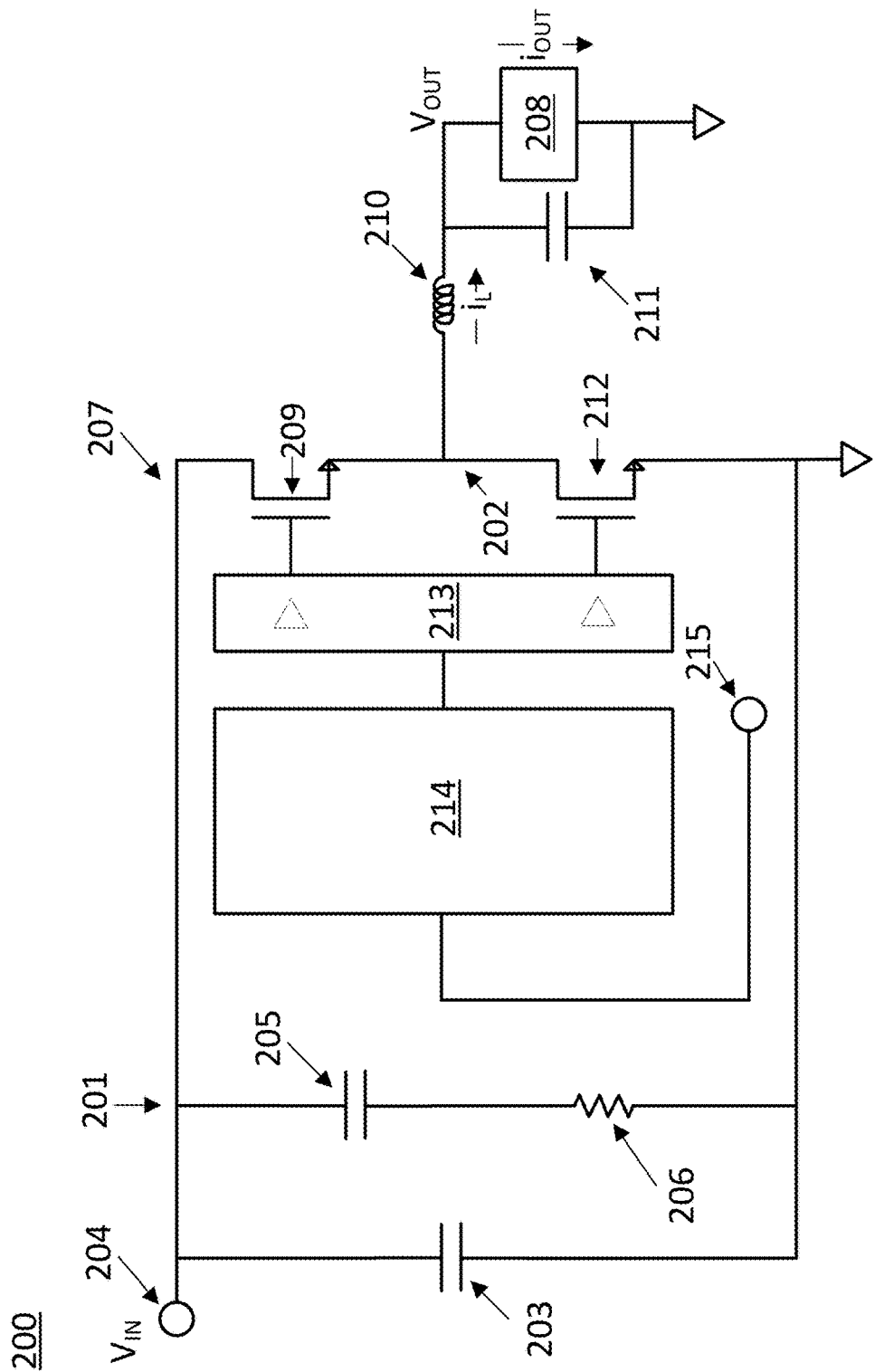
FIG. 2 is a block diagram of a power converter with a high efficiency snubber circuit, in accordance with some embodiments.

FIG. 2 illustrates an example power converter 200 and snubber circuit 201 where the snubber circuit can prevent ringing on phase node 202 while not being directly coupled thereto. Power converter 200 includes a bypass capacitor 203 used for filtering unwanted noise or fluctuations on the input node 204 from affecting power converter 200. Snubber circuit 201 includes a decoupling capacitor 205 and a snubbing resistor 206. The snubber circuit is connected at the synchronous node 207 of power converter 200. The synchronous node may be different than the input node based on the particular physical implementation of power converter 200. For example, packaging leads or printed circuit board traces might add parasitics to the circuit diagram of FIG. 2 that would result in synchronous node 207 and input node 204 acting as separate nets in the circuit. Decoupling capacitor 205 couples and connects synchronous node 207 to a snubbing node. Snubbing resistor 206 couples and connects the snubbing node to ground. There are no other current paths to the snubbing node besides through the decoupling capacitor 205 and snubbing resistor 206. The decoupling capacitor 205 couples and connects synchronous node 207 to the snubbing resistor 206.

Power converter 200 delivers power to load 208 through switch 209. As illustrated, switch 209 is a field effect transistor and can be referred to as the control FET of power converter 200. The switches could alternatively be bipolar junction transistors and are beneficially power devices capable of handling large currents and holding off large voltages. Charge is provided to load 208 through an output filter comprising an inductor 210 and a capacitor 211. The output filter continues to supply power to load 208 even as switch 209 is turned off and switch 212 is turned on. As illustrated, switch 212 is a FET and can be referred to as the synchronous FET of power converter 200. Although both switches are illustrated as n-type devices they could each individually be switched to p-type devices. The relative times that switches 209 and 212 are turned on set the amount of power delivered from the input of the power converter to the output of the power converter. The switching is controlled by gate driver 213 responding to control circuit 214 under the influence of a feedback signal delivered on node 215. The feedback signal includes information regarding the status of the load 208 or the power converter itself. As illustrated, there is no snubber circuit directly connected to phase node 202 and inductor 210, the control FET and the synchronous FET are the only devices connected to phase node 202.

A snubber circuit can include a snubbing resistor in series with a low capacitance value high frequency response input decoupling capacitor to provide a lossless form of damping to oscillations in the phase node of a power converter. The snubber circuit can be connected to the input node or synchronous node of the power converter, but will advantageously be coupled to the synchronous node. Using the circuit of FIG. 2 as an example, snubber circuit 201 can include the decoupling capacitor 205 with a low capacitance in series with the snubbing resistor 206. The decoupling capacitor 205 and the snubbing resistor 206 can be selected to rapidly provide charge to the phase node 202 or rapidly absorb charge therefrom in a manner that critically damps the oscillations that would otherwise occur at phase node 202. In other words, the values of the capacitor and resistor can be selected to set an R-C constant that will be proportional to the frequency of oscillations on the phase node caused by the parasitics on the node and the switching of switches 209 and 212. The snubber circuit thereby dampens oscillations on phase node 202.

Snubber circuit 201, and other snubber circuits of this same class, provide lossless damping to the power converter. As opposed to snubber circuits coupled across switches 209 and 212, snubber circuit 201 is connected directly between what are effectively two different bias voltages. Both $V_{IN}$ and the ground voltage are not designed to vary when the power converter is in standard operation. As a result, there is no large cyclical loss of charge except for the excess current provided to or received from the power converter switches that the input voltage source and bypass capacitor 203 are too slow to handle. The voltage across snubber circuit 201 therefore does not vary wildly between zero and a large DC voltage such as $V_{IN}$ or $V_{OUT}$. Instead, the voltage fluctuates to a significantly lesser extent.

A broader class of snubber circuits in accordance with the teaching of FIG. 2 exhibit topologies that do not provide additional circuit paths except for the direct path from the input of the power converter to ground. In these snubber circuits, the decoupling capacitor and snubbing resistor form a single current path from the input node to the ground node, and there are no Kirchhoff junctions on the single current path. In other words, there are no alternative paths through the snubber circuit from alternative nodes in the power converter system to ground. This broader class of snubber circuits can also include a capacitor and resistor that form a circuit branch between the input node of the power converter and ground. This first circuit branch can be in parallel with a second capacitor, such as bypass capacitor 203, which forms a second circuit branch between the input node and ground. The first and second circuit branches could be the only current paths through the snubber circuit to the ground node of the power converter.

The values of decoupling capacitor 205 and resistor 206 can be selected based on the ratio of the input voltage to the output voltage, the switching frequency, the size of the output inductor, and the parasitics of the switches. The values can also depend loosely on the size of the bypass capacitor 203 in that the decoupling capacitor should be kept greater than one thousandth of the bypass capacitor. For a power converter operating with an input voltage $V_{IN}$ of 12 V, an output voltage $V_{OUT}$ of 1.2 V, a switching frequency of 1.0 MHz, and an output filter inductor 210 of 0.47 uH, the decoupling capacitor could be approximately 0.1 uF and the resistor could be approximately 1 Ohm.

Figure 3:
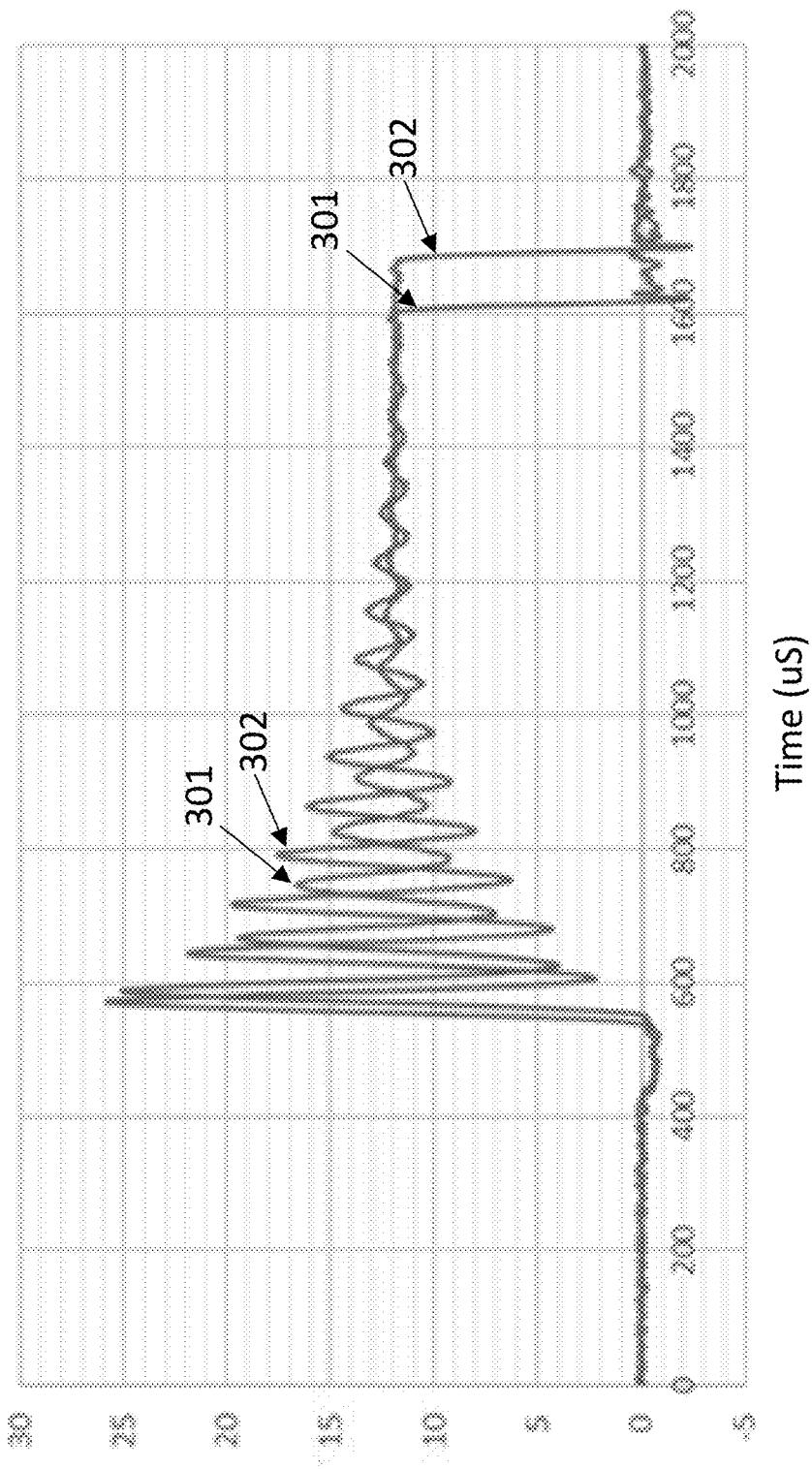
FIG. 3 is a chart including two plots of ringing on the synchronous node of a power converter where one plot illustrates a snubber in accordance with the snubber circuit of FIG. 2 and one plot illustrates a snubber in accordance with the snubber circuit of FIG. 2 without the series resistor.

FIG. 3 illustrates a set of axes 300 in which the abscissa is time in units of microseconds and the ordinate is in units of volts. The two curves plotted show the voltage on the phase node of a power converter. A first curve 301 shows how a snubber circuit such as the one in power converter 200 behaves with a 1 Ohm resistor and 0.1 uF capacitor. The relevant operating conditions for both curves were an input voltage $V_{IN}$ of 12 V, an output voltage $V_{OUT}$ of 1.2 V, a switching frequency of 1.0 MHz, and an output filter inductor 210 of 0.47 uH with appropriately sized n-type power FETs. A second curve 302 shows how the snubber circuit such as the one in power converter 200 behaves without the resistor. As seen, first curve 301 settles much more quickly than second curve 302. The figure illustrates the importance of selecting both the R and the C values of the snubber circuit. If the R-C constant is too low, charge is provided quickly to the phase node, but the charge is provided too quickly for the node and overshoot and oscillations are higher when the bypass capacitor alone is utilized.

Figure 4:
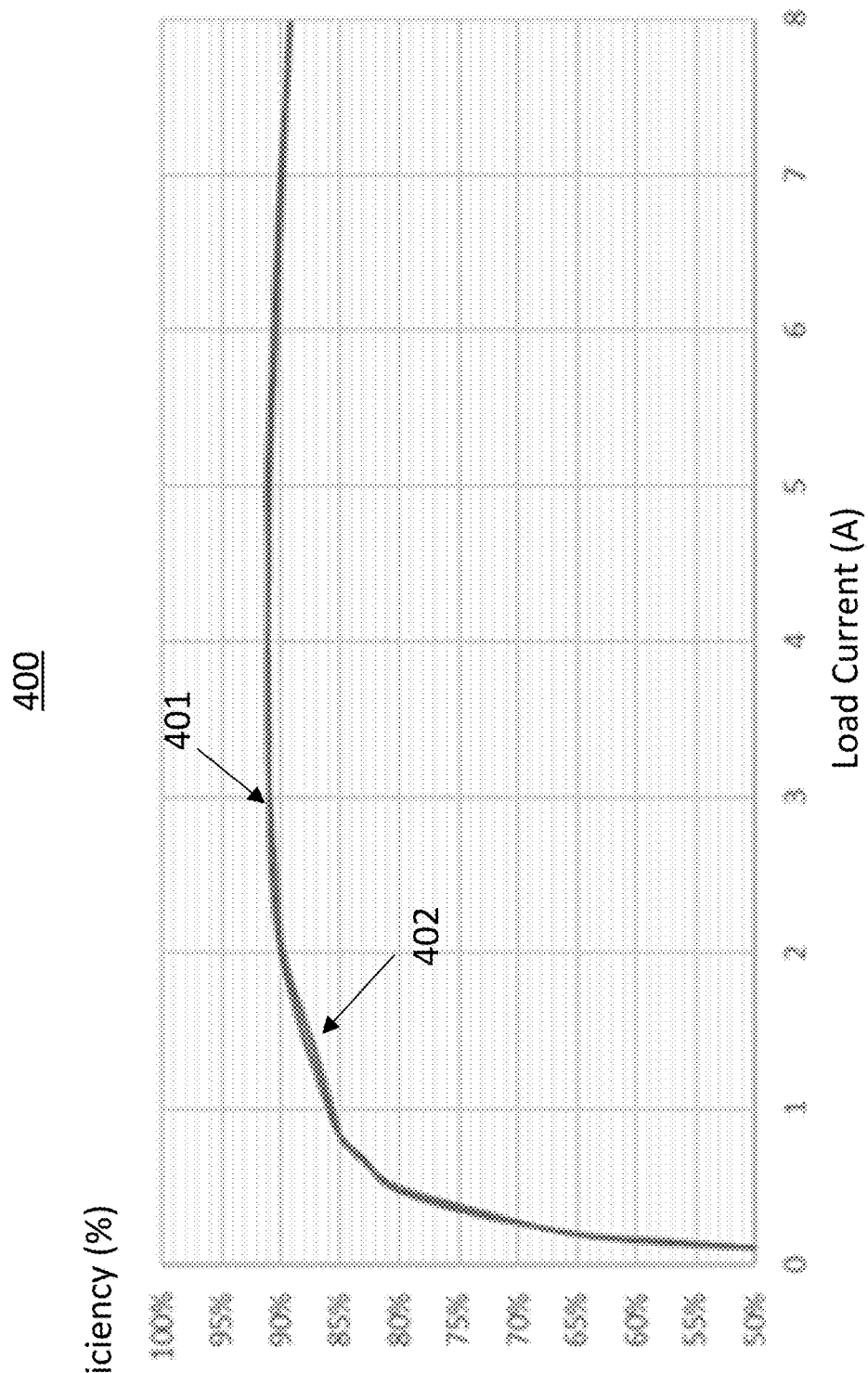
FIG. 4 is a chart including two plots of the efficiency of the snubber circuits used to generate the plots in FIG. 3.

FIG. 4 illustrates a set of axes 400 in which the abscissa is load current $i_L$ in units of amps and the ordinate is efficiency in terms of how much power is consumed in the power converter against how much power is delivered by the power converter. Accordingly, 100% efficiency means that all of the power is delivered by the power converter and none is consumed by the snubber circuit. The two curves 401 and 402 correspond to the conditions mentioned above with respect to curves 301 and 302 respectively. The efficiency is not notably affected by the introduction of the snubbing resistor. In addition, the overall efficiency of the power converter is high compared to approaches in which the snubber circuit is attached to the phase node directly. In particular, the efficiency curve of power converters using snubber circuits attached to the phase node would exhibit a steady and more pronounced decrease in efficiency towards high load currents.

The resistor and the capacitor of the snubbing circuit are selected based on the characteristics of the power converter for which oscillation dampening is required. Power converters operating with high power FETs and switching frequencies in the range of 1 MHz to 8 MHz can generally be considered to operate in the same regime for purposes of selecting these values and the relative tradeoffs associated with the selection of different values. For purposes of explanation, power converter 200 can be considered as having a switching frequency of 1 MHz. Under these conditions, the decoupling capacitor can have a value from 10 nF up to 0.1 uF while still maintaining the benefits disclosed herein in terms of efficiency and dampening. The snubbing resistor can have values on the range of 1-2 Ohms and can be as high as 4 Ohms. The size of the bypass capacitor is generally sized so as to not have a first order effect on the performance of the snubber circuit. To this end, the capacitance of the decoupling capacitor is much less than that of the bypass capacitor. Specifically, the bypass capacitor can be up to 1000 times the decoupling capacitor value. The size of the bypass capacitor is set by other constraints such as the system switching frequency and the input voltage RMS. For example, the decoupling capacitor could be 10 uF. The decoupling capacitor can be a ceramic capacitor such as an MLCC 50V X5R. The decoupling capacitor can be an external component placed on a printed circuit board.

The snubbing resistor value can be increased to add additional dampening to the phase node ringing. For example, doubling the snubbing resistor value will result in an appreciable decrease in ringing. However, as the value of the snubbing resistor is increased, the over-all impedance of the bypass capacitor begins to increase which thereby lessens the effect of the damping during the power transistor switching transition. Using the example from FIGS. 3 and 4, increasing the snubbing resistance beyond 4 Ohms would cause this decrease in the damping.

The decoupling capacitor is the capacitor that supplies the main switching charge to the power transistors as the switches begin to conduct the full output current of the power converter. In the example of FIG. 2, this is the full inductor current, and reverse recovery current from the body diode of switch 212. This switching transition in general happens much quicker as compared to the converter operational switching frequency. The decoupling capacitor must have a low impedance at frequencies higher than the switching frequency of the converter so that, during the ramp up time of the current in the switch 209, the charge can be sourced from the capacitor 205. As the value of the decoupling capacitor is increased, the impedance of the capacitor becomes more inductive rather than capacitive at the higher frequencies associated with the switching transition of switch 209, which lessens the damping which can be provided by the snubbing resistor 206. The value of the decoupling capacitor can be lowered as required by the performance of the associated system of the converter. The size, and inherent switching times of a specific power transistor, and the PCB board inductance will vary the ramp up time of the current in the power transistor.

Figure 5:
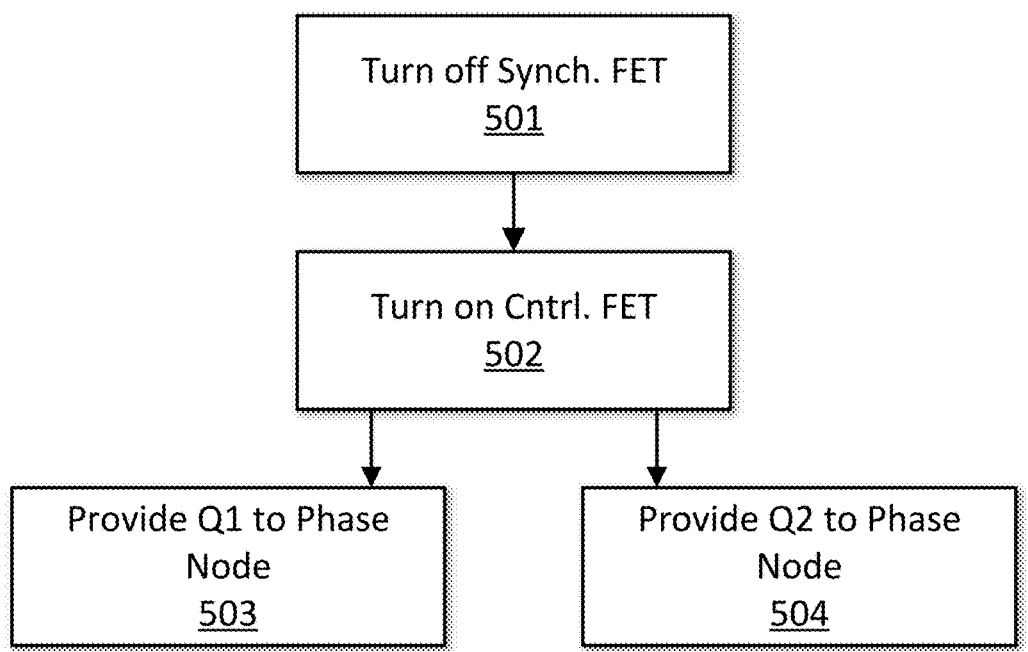
FIG. 5 is a flow chart of a set of methods for reducing ringing in a power converter using a high efficiency snubber circuit, in accordance with some embodiments.

FIG. 5 illustrates a flow chart 500 for a set of methods for damping oscillations on the phase node of a power converter. The method includes a step 501 of turning off a synchronous power transistor that is connected to the phase node and ground. The method continues with a step 502 of turning on a control power transistor to create a low impedance circuit path from an input node of the power converter to the phase node of the power converter. The control power transistor could be control switch 209 from power converter 200. The synchronous transistor could be the synchronous switch 212 from power converter 200. A brief dead time could be added between steps 501 and 502 to assure that the input voltage is not directly coupled to ground via a cross bar current through a low impedance path across both power transistors.

Flow chart 500 continues with two simultaneous steps 503 and 504 in which charge is provided through the control power transistor to the phase node. In step 503, a first quantity of charge is provided from a first capacitor to the phase node within 10 picoseconds of the control power transistor turning on. In step 504, a second quantity of charge is provided from a second capacitor to the phase node within 10 picoseconds of the control power transistor turning on. The first capacitor could be bypass capacitor 203. The second capacitor could be decoupling capacitor 205. The second quantity of charge is larger than the first quantity of charge. The second capacitor is in series with a resistor and connects the input of the power converter to ground in combination with the resistor. The first capacitor directly couples the input of the power converter to ground. However, the second capacitor more quickly responds to rapid changes in the voltage on the phase node and quickly provides current to dampen oscillations on the phase node of the power converter.

The snubber circuit can be physically implemented along with the power converter in various configurations. The passive components of the snubber circuit can each individually be implemented as discrete passive devices. The discrete devices could be placed on a printed circuit board in close proximity to the power converter. The power converter itself could be implemented on a single integrated circuit or as a chip set combined into a single package. Alternatively, the discrete passive devices could also be combined into a package with the power converter. Furthermore, one or both of the elements of the snubber circuit could be integrated with the power converter. The elements could be formed in the same integrated circuit as specific components of the power converter or the entire power converter if the power converter itself was fully integrated. In the following examples, the power converter is fully integrated such that the switches 209 and 212, gate drive 213, and controller 214 are formed on the same integrated circuit. However, in each of the following examples, the snubber circuit could be integrated with, or used alongside, a power converter that was not completely integrated.

In one approach, a power converter includes a transistor connecting the input node of the power converter to the phase node. The power converter also includes a package located on a printed circuit board. The transistor could be located in the package. The power converter could also include a snubber circuit with a decoupling capacitor and a snubbing resistor. The power converter could also include a bypass capacitor. The bypass capacitor could be bypass capacitor 203, the decoupling capacitor could be decoupling capacitor 205, the snubbing resistor could be snubbing resistor 206. Each of the bypass capacitor, the decoupling capacitor, and the snubbing resistor could be discrete passive component directly attached to the printed circuit board. The connection between the transistor and the discrete components could include package connections and traces on the printed circuit board. The bypass capacitor could be a ceramic capacitor. The decoupling capacitor could be an electrolytic capacitor. The discrete components could also be integrated in the printed circuit board as opposed to being separable components soldered to the printed circuit board.

Figure 6:
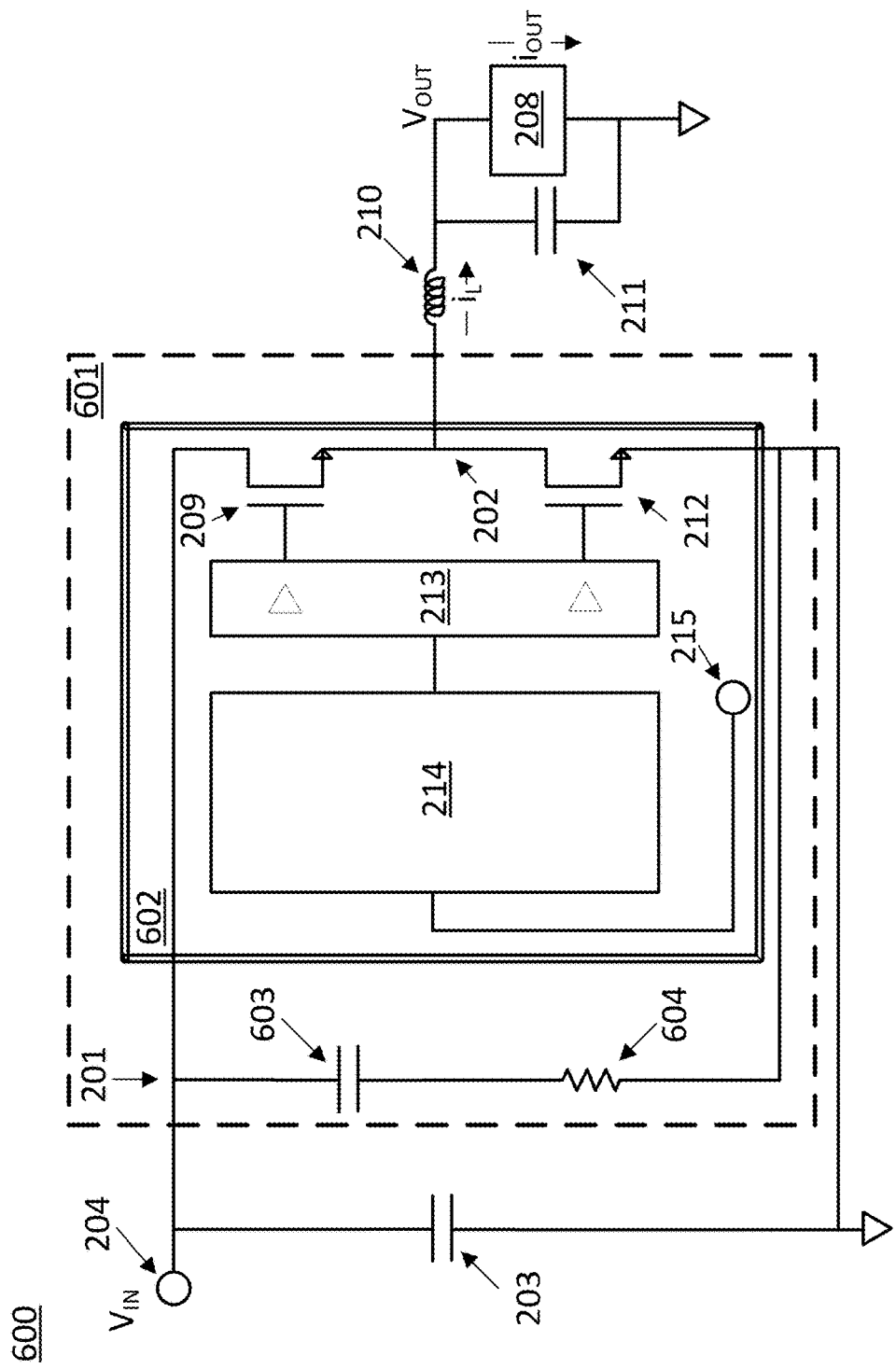
FIG. 6 is a block diagram of a packaged power converter with a high efficiency snubber circuit having discrete components, in accordance with some embodiments.

The snubber circuit could also be integrated in the same package as the other components of the power converter but not in the same integrated circuit as the other components of the power converter. FIG. 6 illustrates a power converter 600 with a package 601 having a snubber circuit comprising decoupling capacitor 603 and snubbing resistor 604, and an integrated circuit 602 with the other power converter components. Notably, the output filter components are implemented outside of package 601, but they could be implemented in the package as well. Package 601 could be implemented on a printed circuit board, and bypass capacitor 203 could be a discrete capacitor directly attached to the printed circuit board via solder or integrated into the printed circuit board. The snubbing resistor 604 and decoupling capacitor 603 could be discrete passive components formed on a substrate of package 602 and coupled to package leads of package 601. The discrete components could also be bonded to sides of the other integrated circuits in package 601 housing the other components of the power converter.

Figure 7:
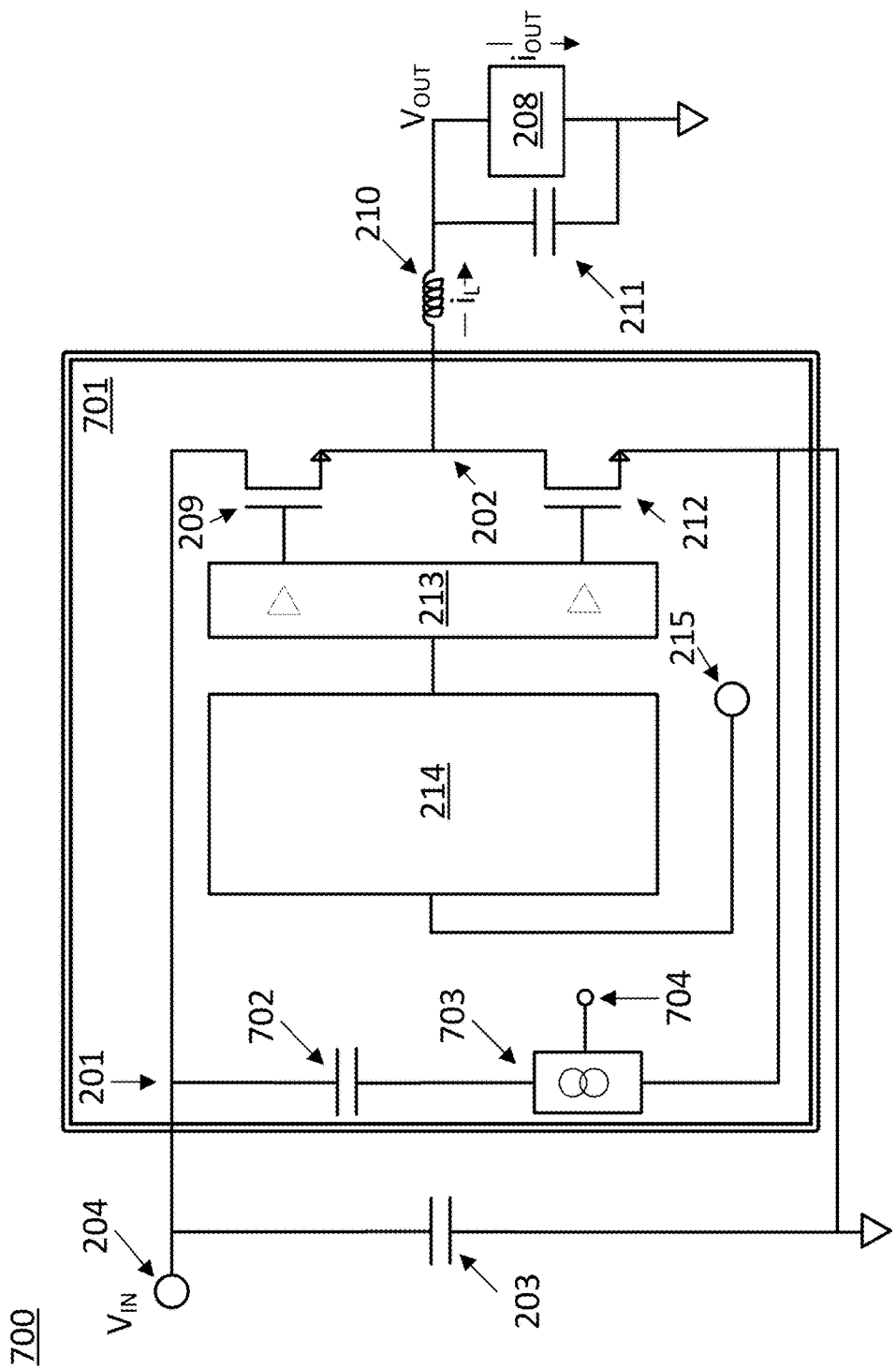
FIG. 7 is a block diagram of a packaged power converter with a high efficiency snubber circuit integrated on the same integrated circuit as the components of the converter, in accordance with some embodiments.

The snubber circuit could also be implemented using active devices such as through the use of resistor and capacitor emulators. In these approaches, the snubber circuit could also be integrated in the same integrated circuit as the other components of the power converter. FIG. 7 illustrates a power converter 700 with a single integrated circuit 701 housing the various elements of the power converter as well as the snubber circuit. In this approach, the snubber circuit includes a decoupling capacitor 702 and a snubbing resistor 703. The decoupling capacitor 702 could be a metal insulator metal capacitor formed in the wiring layers of integrated circuit 701. The snubbing resistor in this case is implemented as an integrated circuit based current mirror as a controlled load controlled by terminal 704 to emulate a resistor. The current mirror could include active devices such as transistors. The transistors could be formed in the same substrate as the transistors in feedback circuit 214. In some approaches, the transistors could be formed in the same substrate as the FETs that implement switches 209 and 212.

Figure 8:
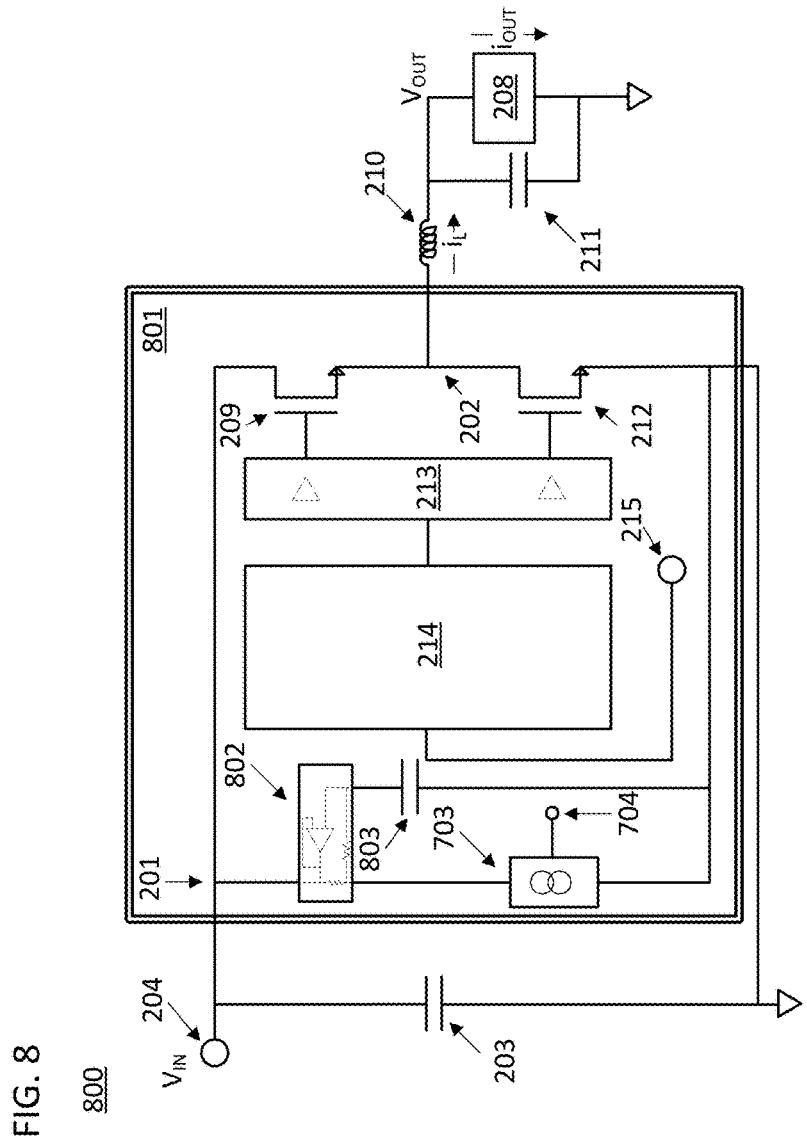
FIG. 8 is a block diagram of a packaged power converter with a high efficiency snubber circuit integrated on the same integrated circuit as the components of the converter where the components of the snubber circuit each include active devices, in accordance with some embodiments.

FIG. 8 illustrates a power converter 800 with a single integrated circuit 801 that is similar to integrated circuit 701 except that the decoupling capacitor of the snubber circuit is implemented as an integrated circuit based capacitor multiplier 802 and small integrated circuit capacitor 803. The capacitor multiplier 802 will multiply the capacitance of capacitor 803 to the size required for appropriate damping of the phase node while avoiding the need to have a large capacitor implemented on an integrated circuit. The integrated circuit based capacitor multiplier 802 and small integrated circuit capacitor 803 are both in the package holding integrated circuit 801. The capacitor multiplier could include active devices such as transistors. The transistors could be formed in the same substrate as the transistors in feedback circuit 214. In some approaches, the transistors could be formed in the same substrate as the FETs that implement switches 209 and 212.

In the approach of FIGS. 7 and 8, the values of the resistor, and the capacitor in FIG. 8, could be trimmed based on the performance of the actual converter. In general, this could be done with any of the approaches described above by introducing trimming circuitry with variable impacts on an associated discrete component for which trimming was being provided. However, the approaches of FIGS. 7 and 8 are particularly amenable to this approach due to the devices inherent use of active circuitry. These approaches could allow for trimming of the components to adjust the R-C value on a device by device basis as the parasitics that contribute to the frequency of the ringing on the phase node can vary from one device to another. More generally, the selection of the R-C values using a trimming circuit places less design risk as the frequency of ringing can be a difficult parameter to model and estimate from an ex ante perspective.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were directed to switching power converters that provided a fixed voltage to a regulated regime, the same approaches can be applied to power converters that provide a fixed current to a regulated regime. In the provided examples, the polarity of reference, ground, and signal carrying voltages can be switched in whole or in part to achieve similar results. For example, a logic low and logic high could be switched provided an additional inverter was added to the system or provided the entire system switched. The power converters could be point of load devices. The point of load devices could be operating in combination with a centralized controller. Furthermore, although examples in the disclosure were directed switching converters the approaches disclosed herein apply to any power converter scheme that transitions between operating modes and includes a control loop. These and other modifications and variations to the present invention may be practiced by those skilled in the art, without departing from the scope of the present invention, which is more particularly set forth in the appended claims.

What is claimed is:

1. A power converter with a snubber circuit, the snubber circuit comprising:
   a first capacitor coupling an input node of the power converter to a ground node of the power converter;
   a second capacitor having a first terminal, wherein the first terminal is coupled to the input node of the power converter;
   a snubbing resistor coupling a second terminal of the second capacitor to the ground node;
   a phase node;
   a synchronous power transistor connected between the phase node and the ground node; and
   a control power transistor connected between the input node and the phase node;
   wherein the snubbing resistor is greater than 1 ohm;
   wherein the first capacitor is greater than 1 microfarads;
   wherein the second capacitor is greater than 5 nanofarads, and less than 0.5 microfarads; and
   wherein the second capacitor comprises a capacitor multiplier and an integrated circuit capacitor, the capacitor multiplier multiplying a capacitance of the integrated circuit capacitor.

2. The power converter of claim 1, further comprising:
   an inductor connected to the phase node;
   wherein the control power transistor, the inductor, and the synchronous power transistor are the only devices of the power converter that are connected to the phase node.

3. The power converter of claim 1, wherein:
   the capacitor multiplier comprises an amplifier, a first resistor having a first terminal and a second terminal, and a second resistor having a first terminal and a second terminal;
   the first terminal of the first resistor is the first terminal of the second capacitor;
   the second terminal of the first resistor is the second terminal of the second capacitor;
   the first terminal of the first resistor is coupled to an output of the amplifier;
   the second terminal of the first resistor is coupled to the first terminal of the second resistor;
   an input of the amplifier and the second terminal of the second resistor are coupled to a first terminal of the integrated circuit capacitor; and
   a second terminal of the integrated circuit capacitor is coupled to the ground node.

4. The power converter of claim 1, wherein:
   the capacitor multiplier comprises a transistor; and
   the transistor of the capacitor multiplier is located in a package with one or both of the synchronous power transistor and the control power transistor.

5. The power converter of claim 1, wherein:
   the capacitor multiplier comprises a transistor; and
   the transistor of the capacitor multiplier is located in a package with a transistor of a feedback circuit.

6. The power converter of claim 1, wherein:
   the capacitor multiplier comprises a transistor;
   the transistor of the capacitor multiplier is formed on a substrate;
   one or both of the control power transistor and the synchronous power transistor are also formed on the substrate; and
   the substrate is a substrate of a single integrated circuit.

7. The power converter of claim 1, wherein:
   the capacitor multiplier comprises a transistor;
   the transistor of the capacitor multiplier is formed on a substrate;
   a transistor of a feedback circuit is also formed on the substrate; and
   the substrate is a substrate of a single integrated circuit.

8. The power converter of claim 1, wherein:
the snubbing resistor comprises a resistor emulator circuit.

9. The power converter of claim 8, wherein the resistor emulator circuit comprises an integrated circuit based current mirror.

10. The power converter of claim 8, wherein:
the resistor emulator circuit comprises a transistor; and
the transistor of the resistor emulator circuit is located in a package with one or both of the synchronous power transistor and the control power transistor.

11. The power converter of claim 8, wherein:
the resistor emulator circuit comprises a transistor; and
the transistor of the resistor emulator circuit is located in a package with a transistor of a feedback circuit.

12. The power converter of claim 8, wherein:
the resistor emulator circuit comprises a transistor;
the transistor of the resistor emulator circuit is formed on a substrate;
one or both of the synchronous power transistor and the control power transistor are also formed on the substrate; and
the substrate is a substrate of a single integrated circuit.

13. The power converter of claim 8, wherein:
the resistor emulator circuit comprises a transistor;
the transistor of the resistor emulator circuit is formed on a substrate;
a transistor of a feedback circuit is also formed on the substrate; and
the substrate is a substrate of a single integrated circuit.

14. A method for damping oscillations on a phase node of a power converter comprising:
turning off a synchronous power transistor that is connected to the phase node and ground;
turning on a control power transistor to create a low impedance circuit path from an input node of the power converter to the phase node;
providing a first quantity of charge from a first capacitor to the phase node; and
providing a second quantity of charge from a second capacitor to the phase node;
wherein the first capacitor is greater than 1 microfarads and couples the input node to a ground node;
wherein the second capacitor is less than the first capacitor, greater than 5 nanofarads, and couples the input node to a resistor emulator circuit;
wherein the resistor emulator circuit emulates a resistance that is greater than 1 ohm and couples the second capacitor to the ground node; and
wherein the second quantity of charge is greater than the first quantity of charge.

15. The method of claim 14, wherein the resistor emulator circuit comprises an integrated circuit based current mirror.

16. The method of claim 14, wherein:
the resistor emulator circuit comprises a transistor; and
the transistor of the resistor emulator circuit is located in a package with one or both of the synchronous power transistor and the control power transistor.

17. The method of claim 14, wherein:
the resistor emulator circuit comprises a transistor; and
the transistor of the resistor emulator circuit is located in a package with a transistor of a feedback circuit.

18. The method of claim 14, wherein:
the resistor emulator circuit comprises a transistor;
the transistor of the resistor emulator circuit is formed on a substrate;
one or both of the synchronous power transistor and the control power transistor are also formed on the substrate; and
the substrate is a substrate of a single integrated circuit.

19. The method of claim 14, wherein:
the resistor emulator circuit comprises a transistor;
the transistor of the resistor emulator circuit is formed on a substrate;
a transistor of a feedback circuit is also formed on the substrate; and
the substrate is a substrate of a single integrated circuit.

20. The method of claim 14, wherein the second capacitor comprises a capacitor multiplier and an integrated circuit capacitor.

21. The method of claim 20, wherein:
the capacitor multiplier comprises a transistor; and
the transistor of the capacitor multiplier is located in a package with one or both of the synchronous power transistor and the control power transistor.

22. The method of claim 20, wherein:
the capacitor multiplier comprises a transistor; and
the transistor of the capacitor multiplier is located in a package with a transistor of a feedback circuit.

23. The method of claim 20, wherein:
the capacitor multiplier comprises a transistor;
the transistor of the capacitor multiplier is formed on a substrate;
one or both of the synchronous power transistor and the control power transistor are also formed on the substrate; and
the substrate is a substrate of a single integrated circuit.

24. The method of claim 20, wherein:
the capacitor multiplier comprises a transistor;
the transistor of the capacitor multiplier is formed on a substrate;
a transistor of a feedback circuit is also formed on the substrate; and
the substrate is a substrate of a single integrated circuit.

* * * * *